United States Patent

Camm

[11] Patent Number: 6,004,620
[45] Date of Patent: Dec. 21, 1999

[54] METHOD OF UNBLOCKING AN OBSTRUCTED COOLING PASSAGE

[75] Inventor: Graham F Camm, Nottingham, United Kingdom

[73] Assignee: Rolls-Royce plc, London, United Kingdom

[21] Appl. No.: 09/181,570

[22] Filed: Oct. 29, 1998

[30] Foreign Application Priority Data

Nov. 12, 1997 [GB] United Kingdom ................... 9723762

[51] Int. Cl.⁶ ....................................................... B05D 3/12
[52] U.S. Cl. .......................... 427/142; 427/273; 427/287; 427/454
[58] Field of Search .................................... 427/247, 273, 427/353, 287, 142, 453, 455, 454; 428/472

[56] References Cited

U.S. PATENT DOCUMENTS

| 4,248,940 | 2/1981 | Goward . | |
|---|---|---|---|
| 4,321,311 | 3/1982 | Strangman . | |
| 4,402,992 | 9/1983 | Liebert . | |
| 4,865,881 | 9/1989 | Sessa et al. | 427/181 |
| 5,032,430 | 7/1991 | Abe et al. | 422/272 |
| 5,262,245 | 11/1993 | Ulion . | |
| 5,514,482 | 5/1996 | Strangman . | |
| 5,667,663 | 9/1997 | Rickerby . | |

FOREIGN PATENT DOCUMENTS

| 713 957 | 5/1996 | European Pat. Off. . |
|---|---|---|
| 0761386 | 3/1997 | European Pat. Off. . |
| 1761386 | 3/1997 | European Pat. Off. . |
| 1184987 | 7/1989 | Japan . |
| 96-263148 | 4/1996 | Japan . |

OTHER PUBLICATIONS

UK Search report.

*Primary Examiner*—Frederick Parker
*Attorney, Agent, or Firm*—W. Warren Taltavull; Farkas & Manelli PLLC

[57] ABSTRACT

A method of coating a component (6) having at least one passage (16) entirely therethrough. The method comprising the steps of applying a coating (28) to a region of the surface (22) of the component (6), adjacent to one end of the passage. Then directing a liquid jet (38) through the other end of the said passage (16) so as to remove at least a portion of any coating material (28) located within, or obstructing, the passage (16). In this method the jet is channelled by a first portion (42) of the passage (16) before it encounters the coating material (28) within, or obstructing, the passage (16). In particular the jet (38) is a water jet, which is used to remove a ceramic coating (28) from a component (6). The method has particular use in clearing cooling holes (16) within combustor components or turbine blades. The method can also be used in the repair of such components (6).

13 Claims, 4 Drawing Sheets

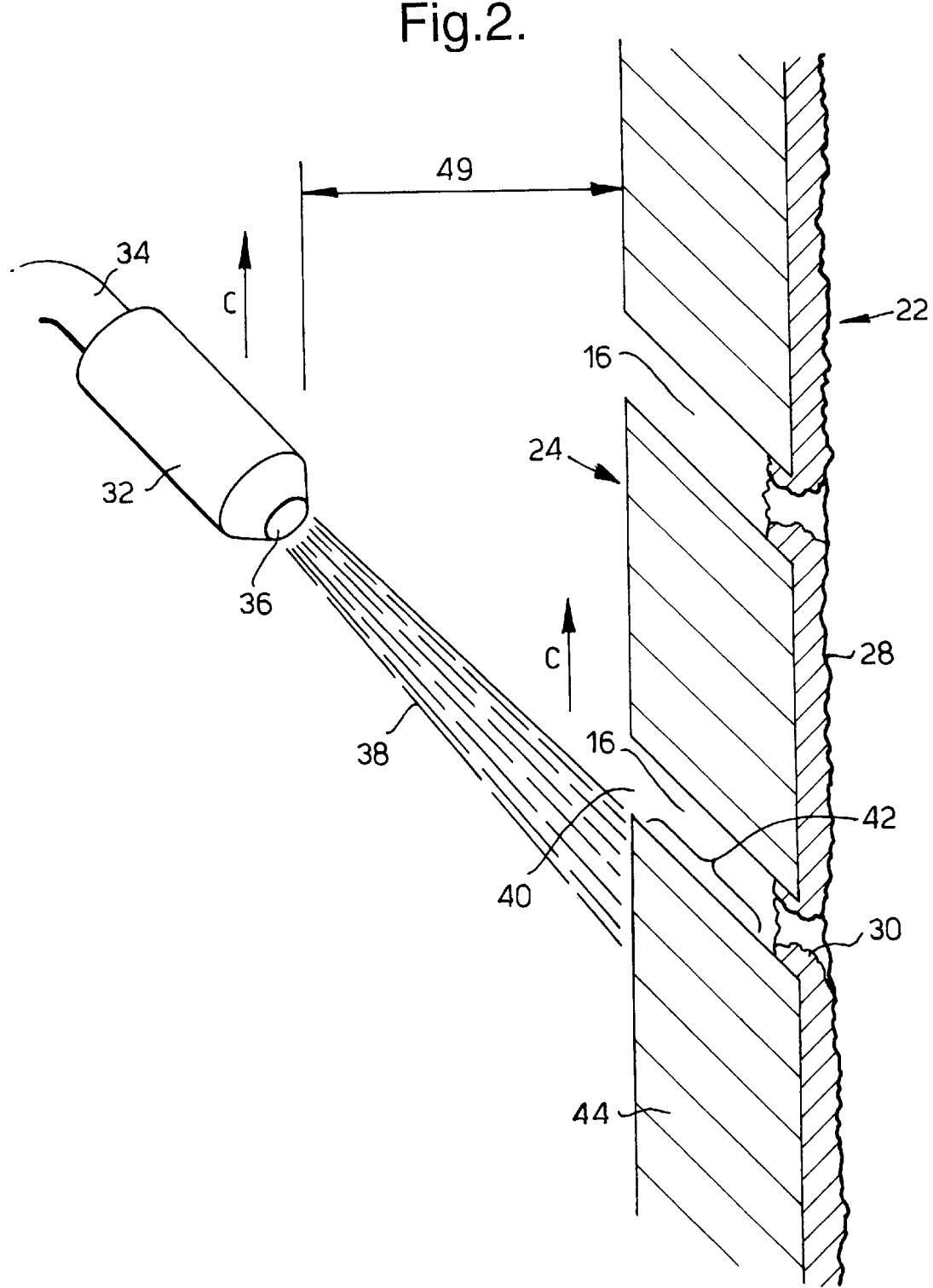

METHOD OF UNBLOCKING AN OBSTRUCTED COOLING PASSAGE

THE FIELD OF THE INVENTION

The present invention relates generally to a method of coating a component having holes through its walls. In particular it relates to a method of removing excess coating material from within the cooling holes of coated gas turbine components.

BACKGROUND OF THE INVENTION

Gas turbine engines operate at extremely high temperatures for increased performance and efficiency. A limiting factor in most gas turbine engine designs, however, is the maximum temperature that various components of the engine can tolerate. One such particular component area which is so limited is the combustion chamber of a gas turbine engine.

One method to increase the maximum allowable temperature and/or decrease the component metal temperature is to provide cooling holes in the walls of the component. These holes allow cool air to flow through and along the walls of the component exposed to the high gas temperatures. As the air flows along the surface of the walls it forms a cool layer. This cool layer reduces the temperature of the wall surface and physically keeps the hot gases from contacting the walls of the component, thereby permitting the component to withstand higher gas temperatures than would otherwise be possible.

Another method of allowing higher gas temperatures to be used is to apply a protective thermal barrier coating to the walls of the component that are exposed to the hot gases. In the case of combustors this is, in particular, the inner walls of the flame tube, the outer walls being exposed to cooler compressor delivery air. Such coatings conventionally comprise, for example a MCrAlY material which offer thermal and corrosion protection. MCrAlY refers to known coating systems in which M denotes nickel, cobalt, iron or mixtures thereof; Cr denotes chromium; Al denotes aluminium; and Y denotes yttrium. A further ceramic layer is also often applied on top of the MCrAlY layer to give improved thermal protection. In such an arrangement the MCrAlY layer acts as a bond coat for the ceramic coating layer. An example of such a ceramic coating material is yttria stabilised zirconia which is applied on top of an MCrAlY layer.

The MCrAlY and ceramic protective coatings are typically applied by physical vapour deposition (PVD), chemical vapour deposition (CVD) or plasma spraying means. Examples of such protective coatings and the methods of applying them are well known and are described in: U.S. Pat. No. 4,321,311, U.S. Pat. No. 5,514,482, U.S Pat. No. 4,248,940 among many others.

Cooling holes and protective coatings can, and are, used in conjunction to allow operation of a component at a high temperature. There are two basic methods for producing such components that have cooling holes and a protective coating. In the first method the coating is applied to the component and then the holes are drilled through the coated component. Examples of this method are described in pending European Patent Application Number 97305454 in which laser drilling is used to penetrate a thermal barrier coating and the metal of the component. A problem with this method is that, by design, the thermal barrier coating is resistant to heating produced by the laser to drill through the material. Consequently drilling of the coating requires a high power laser, a prolonged operation, and results in considerable heating of the surrounding area which can be undesirable. Problems also exist if mechanical drilling techniques are used since the thermal barrier coatings are generally brittle. Mechanical drilling can crack and damage the coating in the region around the holes causing the coating to fall off the component either during the machining operation or prematurely during service.

In the second method holes are drilled in the component and then the coating is applied to the drilled component. This method does not have any of the problems associated with drilling/machining through the coating described above. However application of the coating after the holes have been drilled does tend to at least partially block some or all of the holes. This restricts the flow of cooling air through the holes and can result inadequate cooling of the component producing hot spots, overheating and possible failure of the component. Furthermore the blocking of the cooling holes is unpredictable and so designing the holes to accommodate a degree of blockage is problematic and also, if it is possible will reduce the efficiency of the engine.

Consequently any coating material blocking the cooling holes has to be removed. The problem of cooling hole blockage and a method of removing the coating from a cooling hole is described in EP 0,761,386. According to this patent an abrasive slurry under pressure is directed at the coating on the component. This slurry flows through the cooling holes thereby removing the coating material that is blocking the hole. A similar technique using a high pressure fluid jet is also described in JP 8108400.

A problem with both of these methods of clearing the holes is that the high pressure fluid jet, and the abrasive slurry, as well as removing the coating material from within the hole can also undesirably damage the remainder of the coating on the component. In particular the coating material in the region around the cooling hole is often damaged. This damage to the coating can reduce the coating thickness and/or reduce its adhesion to the component resulting in the coating falling off.

Further problems are that the high pressure fluid, and the abrasive slurry, have to be accurately directed at the specific cooling holes. This requires that the high pressure fluid jet, or abrasive slurry, be accurately controlled and directed. This is however difficult to achieve in a production environment and the machines capable of such accurate control are expensive. An alternative way of accurately directing the abrasive slurry or jet at a particular hole is to use a protective maskant or suitable tooling to mask some of the holes, and possibly the surrounding area of the coating. The mask protects the areas of the component from the jet or abrasive slurry and accurately directs the high pressure fluid or abrasive slurry into the holes. The mask is then removed and applied to a different area and cooling holes in order to clear all of the holes of the component. This process is, however, slow and is not conducive to a production environment. There is also a possibility that if a maskant is used that the maskant may not be fully removed and may itself block the cooling holes. A maskant, or the method of removal of the maskant, may also damage the coating.

SUMMARY OF THE INVENTION

It is therefore desirable to provide an improved method of removing material from holes within a component that addresses the above mentioned problems and/or offers improvements generally to such methods.

According to the present invention there is provided a method of coating a component having at least one passage entirely therethrough comprising the steps of applying a coating to a region of the surface of said component adjacent one end of said at least one passage and directing a fluid jet through the other end of the said at least one passage so as to remove at least a portion of any coating material located within, or obstructing, the passage.

In this method the component itself is used as a mask to direct a high pressure fluid jet though a cooling hole, whereupon it machines away and removes any material blocking the hole. This has the advantage that the jet does not have to be accurately directed at a particular hole allowing a less accurate, cheaper and simpler machine to be used. In addition the remainder of the coating which is not blocking the hole is protected from the jet by the component itself. Any damage to the coating is therefore reduced. The use of the component itself as a mask also means that the process is simple and relatively rapid.

Preferably the fluid jet is a water jet.

The at least one passage may be arranged to provide, in use, a cooling flow for the component. The component may be made from a metal and the coating may be a ceramic.

Preferably the component is a combustor flame tube. Alternatively the component maybe be a turbine blade.

Preferably the jet is channelled by a first portion of the at least one passage, adjacent the first side of the component, before it encounters the coating material within the passage.

Furthermore the component may have a plurality of passages, the method comprising directing the jet through a first passage and then traversing the jet across the first surface of the component to a next passage where upon it flows through the next passage.

Preferably the jet is traversed at a constant rate over a region of the first surface of the component in which the passages are located. Substantially all of the coating within the passage may be removed from the first passage before the jet is traversed to the next passage.

Preferably the component is rotated relative to the fluid jet such that the fluid jet is intermittently directed through the at least one passage during the rotation of the component.

According to another aspect of the invention there is provided a method of manufacturing a component which has a plurality of passages within its walls and has a coating applied to one surface of the walls at least in the region of the at least one passage; the method comprising a) producing a component with at least one passage, b) applying a coating to a region of the surface of the component adjacent one end of the said at least one passage, c) directing a fluid jet through the other end of said at least one passage so as to remove at least a portion of any coating located within or obstructing the passage, d) repeating step c) for all of the passages in the component until the passages have substantially been cleared of any coating material within, or obstructing, the passages.

DETAILED DESCRIPTION OF THE INVENTION

Figure 1:
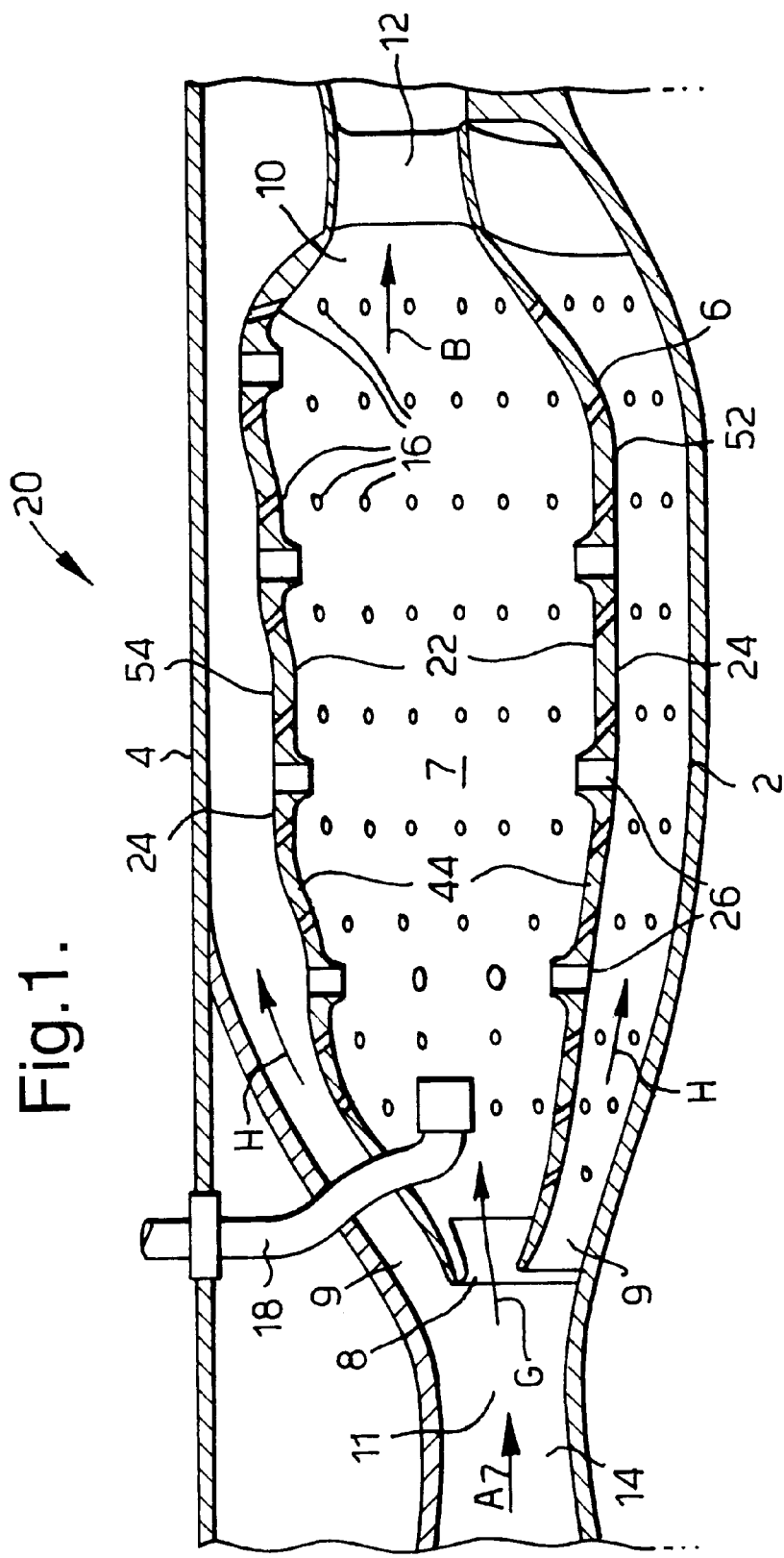
Figure 3A:
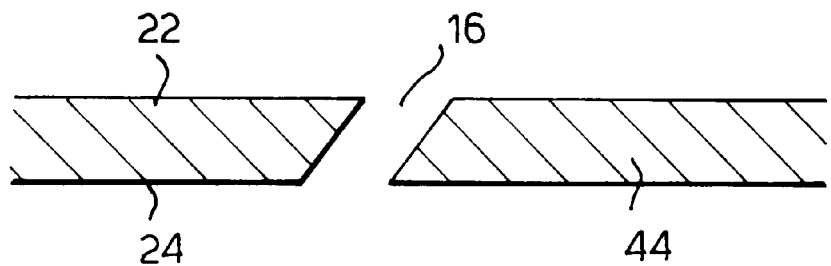
Figure 4:
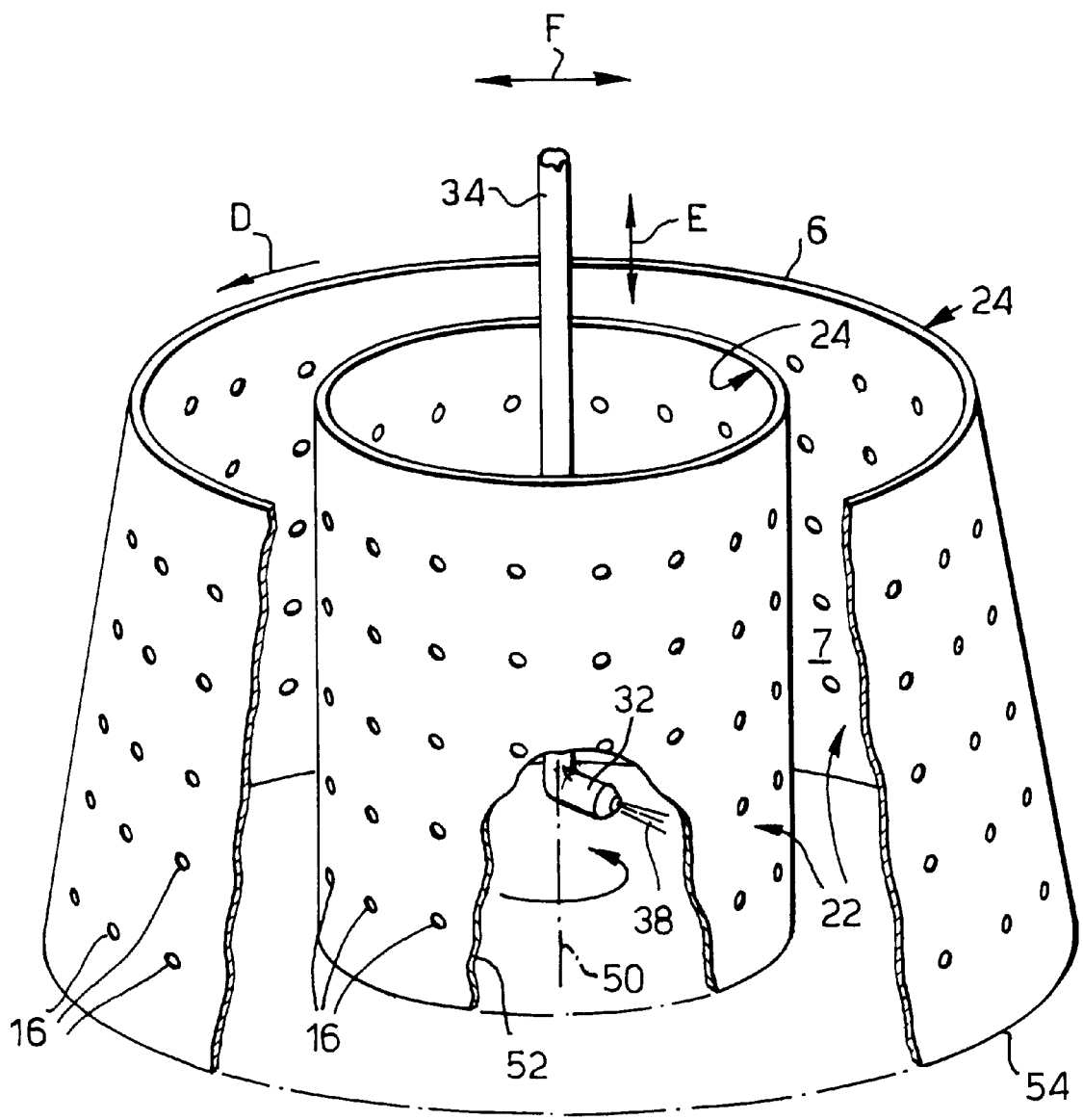

The present invention will now be described, by way of example only, with reference to the accompanying drawings in which;

FIG. 1 is a sectional view of a part of an annular combustor section of a gas turbine engine, FIG. 2 is an illustrative view of a fluid jet operating on a part of a combustor flame tube wall in accordance with the present invention, FIGS. 3a,b,c are diagrammatic views showing the combustor flame tube wall and cooling hole at various stages during manufacture in accordance with the present invention, FIG. 4 illustrates a second embodiment method of machining holes in a combustor flame tube according to the present invention.

DETAILED DESCRIPTION OF THE INVENTION

Referring to FIG. 1 there is shown a combustor section of a gas turbine engine. Inner and outer annular casing walls 2 and 4 respectively define an annular duct 11. Within this annular duct 11 there is provided an annular flame tube 6. Compressed air from a compressor section (not shown) of the gas turbine engine flows, as shown by arrow A, into this duct 11 through an inlet 14. A portion of this air flows into the interior 7 of the flame tube 6 as shown by arrow G, through an upstream annular flame tube inlet 8. The remainder of the air flows around the outside 9 of the flame tube 6, as shown by arrows H. The air entering the flame tube 6 is mixed with fuel, which is supplied from a number of fuel nozzles 18 within the flame tube 6. The resulting fuel/air mixture in the interior 7 of the flame tube 6 is then burnt to produce a high temperature gas stream. This high temperature gas stream flows along the flame tube 6 as shown by arrow B, through an annular outlet 10 and series of outlet guide vanes 12 at the downstream end of the flame tube 6 and combustor 20, into the turbine section and/or the exhaust of the gas turbine engine.

The walls 44 of the annular flame tube 6 are pierced by a number of cooling holes 16. The cooling holes 16 act as passages through the walls 44 of the flame tube 6. Cool compressed air flowing around the flame tube 6 flows through these holes 16 into the interior 7 of the flame tube 6 and along the walls 44 of the flame tube 6. This flow of cool air through the walls 44 of the flame tube 6 cools the walls 44 of the flame tube 6. The flow of air along the inside walls 22 of the flame tube 6 produces a layer of relatively cool air adjacent to these walls 22 which provides a thermal barrier between the wall 44 of the flame tube 6 and the hot combustion gases within 7 the flame tube 6. A thermal barrier coating 28, generally comprising a layer of ceramic material is also provided on the inside walls 22 of the flame tube 6 which also protects the walls 44 of the flame tube 6 from the hot combustion gases.

The flame tube 6 may also have a number of other, larger, openings 26 within the walls 44 to admit additional compressed air to the interior 7 of the flame tube 6. This additional air being provided to aid further, and more complete combustion within the interior 7 of the flame tube 6.

The flame tube 6 is made from sheet metal, generally a high temperature alloy for example a nickel cobalt or iron superalloy, which is fabricated into the required shape of the flame tube walls 44. The thickness of the metal walls is typically between 1–1.6 mm. Alternatively the metal flame tube 6 can be fabricated from forged rings or even cast.

The cooling holes 16 in the flame tube walls 44 are conventionally produced by such methods as electrical discharge machining (EDM) or laser drilling. FIG. 3a, shows a detailed view of a hole 16 produced in the flame tube wall 44. As shown the cooling holes 16 are generally angled in the flow direction and act in effect as passages through the walls 44 of the component. Such angling promotes the formation of a layer of cool air along the inside 22 of the flame tube walls 44. The diameter of the cooling holes 16 is typically between about 0.25 mm and about 0.76 mm.

After production of the cooling holes 16, the interior surfaces 22 of the flame tube walls 44, which define the interior 7 of the flame tube 6, are coated with a thermal barrier coating 28. This coating 28 on the interior surfaces 22 provides the flame tube walls 44 with protection from the high temperature combustion gases. The exterior surfaces 24 of the flame tube 7, being exposed to relatively cool compressor air 9, do not require thermal protection and are accordingly not coated. Typically the coating 28 comprises a MCrAlY, and/or an aluminide bond coat that is first applied to the wall. On top of this bond coat a ceramic coating, for example yttria stabilised zirconia, is deposited. Such coatings are well known in the art and are applied by conventional techniques for example sputtering, electron beam physical vapour deposition (EBPVD), and plasma spraying. An example of such a coating 28 and method of application is described in U.S. Pat. No. 4,321,311, which describes an MCrAlY bond coat and alumina layer and an EBPVD columnar grain ceramic layer. U.S. Pat. No. 5,514,482 describes a diffusion aluminide bond coat with an alumina layer and then an EBPVD ceramic layer. U.S. Pat. No. 5262245 describes an MCrAlY bond coat with a plasma sprayed ceramic layer. Further examples are described in U.S. Pat. No. 4,248,940, U.S. Pat. No. 5,645,893 and U.S. Pat. No. 5,667,663.

The thickness of these coatings 28 is typically between about 0.3 mm to about 0.5 mm depending upon the particular requirements of the combustor 20, or component being protected.

Figure 3B:
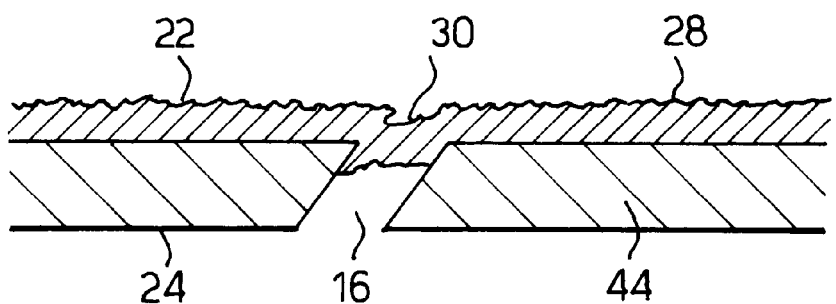

Application of the coating 28 often results in an undesirable accumulation 30 of the coating material within and over the cooling holes 16, as shown in FIGS. 2 and 3b. This accumulation may either partially or totally block the cooling hole 16, thereby restricting or preventing the flow of cooling air through the hole 16 during engine operation. This, if not removed, may result in inadequate cooling of the flame tube wall 44 and a reduction or elimination in the thickness of the cooling layer adjacent the flame tube walls 44. In turn this may then lead to local hot spots on the flame tube wall 44 which may cause the flame tube material to fail and will reduce the service life of the component.

Accordingly after application of the coating 28 the accumulation 30 of coating material within and over the holes 16 is removed. This is achieved using a high pressure water jet 38 as shown in FIG. 2. High pressure water jet machining and machines capable of carrying out the process are generally known. Examples of such machines are produced and available from Flow Europe GmbH, Germany. Such machines have a nozzle 32 which is supplied by means of a supply pipe 34 with high pressure water, typically between about 10,000 psi (689 bar) and about 60,000 psi (4136 bar). This exits the nozzle 32 through a circular orifice 36 producing a generally circular jet 38 of high pressure water. The diameter of the jet 38 is generally between about 0.7 mm and 1.7 mm, and is typically about 1 mm. The nozzle 32 is mounted on a suitable support means (not shown), for example a robot arm, that is capable of moving the nozzle 32, and jet 38, relative to a workpiece, for example the flame tube 6.

According to the method of the invention the water jet 38, from a suitable water jet machine, is directed against the exterior surfaces 24 of the flame tube 6 in the region of the holes 16. The jet 38 is angled so that it impinges the walls 44 of the flame tube 6 at substantially the same angle as the cooling holes 16 and is traversed over the holes 16 in the flame tube walls 44, as shown generally by arrows C. The pressure of the water jet 38, the distance 49 (sometimes call standoff) between the nozzle 32 and the flame tube walls 44, and the length of time that the jet 38 impinges on the surface are all controlled such that there is substantially no machining of the metal of the uncoated exterior surface 24 of the flame tube walls 44. Typically a standoff distance 49 of up to about 20 mm is used.

Figure 3C:
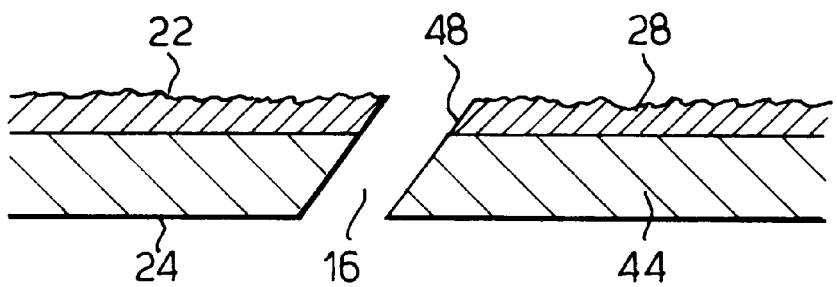

As the jet 38 is traversed across uncoated side 24 of the flame tube walls 44 it encounters a cooling hole 16. The cooling hole is in effect a passage and once the jet 38 enters the hole 16 it is guided and channelled by the unblocked metal sides of a first portion 42 of the cooling hole 16 extending from the entrance 40. At the hole exit the jet 38 encounters the coating accumulation 30 blocking or partially restricting the hole 16. The coating 28 material, for example a ceramic, is less resistant to the water jet 38 than the metal of the flame tube wall 44. The water jet 38 therefore machines away, by particle erosion, the coating accumulation 30 within the cooling hole 16 until the jet 38 can pass freely through the cooling hole 16. An illustration of a cleared hole 16 is shown in FIG. 3c. As can be seen, by this method, a clear well defined hole exit 48 is produced through the coating 28. The jet 38 is then traversed to the next cooling hole 16 and the process repeated until all of the cooling holes 16 have been cleared. By this method each of the cooling holes 16 are cleared in succession.

Since the jet 38 is guided by the first portion 42 of the hole 16 accurate alignment of the jet 38 with the hole 16 is not required using this method. Additionally since, in this case, the cooling holes 16 are of a smaller diameter than the water jet 38, the jet 38 will still overlap the hole 16 even when not fully aligned. Furthermore since the water jet 38 is directed against the exterior side 24 of the flame tube 6, the coating 28 on the interior surface 22 that is not within the hole 16 is not exposed to the water jet 38. Consequently the possibility of the remainder of the coating 28, on the interior side 22 of the wall 44, being damaged by the water jet 38 is substantially eliminated. This is not the case in the prior art methods where a machining jet or abrasive fluid is supplied from the coated interior side 22 of the component.

A further advantage is that water jet machining is a relatively cool process so that there is substantially no heating of the component. This can be contrasted with other prior methods where significant heating of the component can occur. In particular this can be the case with laser drilling through a coating. Such heating, in the prior methods, can cause cracking of the coating and thermal damage to the component.

In an alternative method the water jet 38 is traversed repeatedly across the uncoated side of the flame tube wall 44 containing the holes 16. During each traverse, or pass, the jet periodically encounters the cooling holes 16 and flows through them. Generally a traverse rate of between about 0.5 m/minute and 10m/minute, and typically of 2 m/minute is used for a substantially linear traverse of the jet 38. At such a rate there is not sufficient time for the jet to remove all of the coating 30 from within the hole 16 in a single pass. Consequently only a portion of the material 30 is removed from within the hole 16 during a single pass of the jet 38 over, and through, a hole 16. The hole 16 is fully cleared after a number of individual passes of the jet 38 over and through the hole 16.

The advantage of this method is that a large number of holes 16, within a single pass of the jet, can be cleared at substantially the same time. The jet 38 also does not have to be paused and directed individually at each hole 16. Consequently this alternative method requires even less alignment of the jet 38 with the holes 16 and provides an even faster method of clearing the holes 16. Furthermore since accurate control of the water jet 38 is not critical in this method, less accurately controlled water jet machines that are simpler and cheaper can be used.

A further variation of the above method is shown in FIG. 4. The flame tube 6, as described previously with reference to FIG. 1, has a coating 28 on the inside 22 walls of the annulus defined by the flame tube 6. A radially directed water jet 38 is traversed across the cooling holes 16 by rotating the flame tube 6 about its longitudinal axis 50, as shown by D. The jet 38 thereby acts on an entire circumference of the flame tube wall 44, in which the holes 16 have been drilled, during rotation of the flame tube 6. The water jet 38 is then axially translated, as shown by arrow E, to impinge a further circumference, and series of holes 16, axially along the flame tube 6. The jet 38 is also moved radially, shown by arrow F, relative to the flame tube walls 44 to achieve the required standoff distance 49. Rotation of the flame tube 6 is carried out by any conventional means, for example by mounting the flame tube 6 upon a rotary table. The above rotary system provides a simpler and easier method of traversing the jet 38 over the surface of the component, and higher traverse rates than can be easily achieved with a linear system can be produced. In a rotary system a traverse rate of the jet 38 over the surface of the component of 5 m/s can be used. It will be appreciated that with such rapid traverse rates only a very small amount of coating 28 material will be removed in any pass of the jet over the hole 16.

In the arrangement shown in FIG. 4 the jet 38 is shown being used to clear the holes 16 in the inner walls 52 of the flame tube. It will be appreciated that to clear the holes 16 in the outer walls 54 the jet 38 is mounted outside of the outer wall 54 of the flame tube 6, with the jet 38 being directed radially inward. By this method the holes 16 that have been drilled within the flame tube walls 44 are cleared by repeated passes of the water jet 38 as the flame tube 6 rotates.

In a specific illustrative test of the basic method of the invention a 1 mm thick piece test piece of C263, a nickel cobalt superalloy, was laser drilled with a number of 0.5 mm holes, in a row, with each hole inclined at an angle of 300. One side of the test piece was then then coated with a 0.4 mm thick layer of a standard ceramic thermal barrier coating. In this test the coating comprised a 0.1 mm layer of MCrAlY bond coat, applied by plasma spraying, with a 0.3 mm layer of yttria stabilised zirconia ceramic deposited by plasma spraying on top of the bond coat. This coating at least partially blocked the pre drilled holes. A 1 mm circular water jet at a pressure of 50,000 psi, oriented at the same 30° angle as the holes, was directed at the metal side of the test piece with the water jet nozzle approximately 10 mm from the test piece. This jet was traversed across the row of holes at a constant rate of 2 m/minute. Inspection of the holes showed that they had been adequately cleared of the ceramic coating previously deposited within them. The coating around the holes was also substantially unaffected with a clean hole having been machined through the coating by the water jet. There was also no significant damage to the surface of the test piece that was exposed to the water jet during traversal of the jet between holes. Although this method has been described in relation to clearing holes in annular flame tubes 6 it will be appreciated that it can be applied to other known types of combustors which incorporate cooling holes, or other small holes, and have a coating material applied to one side of their walls in the region of the holes. For example it can be used with cannular combustors that comprise a number of individual cylindrical combustion cans disposed around the engine. The method of the invention can also be applied to clearing cooling holes within the combustor tiles of a tiled combustor. On side of the tiles being generally coated with a thermal barrier coating. Such tiled combustors also being well known in the art.

The method of the invention can also be applied to other components both within the combustion section 20 of a gas turbine engine and more generally. Indeed it is envisaged that it can be used to manufacture any component which, during manufacture, may have holes that are blocked, or partially blocked, by a coating material. For example it can also be applied to the manufacture of turbine blades which have cooling holes and are coated, on their outside, with a thermal barrier coating. A restriction on the application of the method though is that there must be sufficient access for the jet to be directed at the cooling holes. This could possibly be a problem for some, in particular small, turbine blades where there must be sufficient room for the nozzle and jet to be inserted and operate inside of the blade.

The method is not limited to use in removing thermal barrier protective coatings from within cooling holes. Other coatings may similarly block, or partially block any holes in the flame tube 6, or any other component. Such coatings could be applied, for example, to offer corrosion protection of the component.

It will also be appreciated that the method can be applied to the repair of components as well as in their original manufacture. During repair and overhaul of used components the coating material is usually removed. A new coating is then applied which will generally block or partially block the original cooling holes in the component. Accordingly the method of the invention can then be applied to remove this excess coating material from these cooling holes.

In the embodiments of the invention a water jet 38 has been described as being used to clear the holes. In alternative embodiments though other fluids could be used. An abrasive material could also be introduced into the fluid jet which, for a given jet pressure and standoff, will increase the machining power of the jet. In such variations, care must be taken to ensure that the fluid jet does not machine the metal of the component whilst at the same time it is powerful enough to remove the coating material from within the holes. The possibility of damaging the metal of the component can also be reduced by traversing the jet rapidly over metal such that the jet does not impinge the same area for a prolonged period.

I claim:

1. A method of coating a component having first and second oppositely facing surfaces with at least one passage extending entirely between said surfaces, with each passage having a first and second end terminating at said first and second surfaces, respectively, comprising the steps of:
    a) applying a coating to at least a portion of the first surface of said component adjacent at least one first end of a passage while leaving the second surface uncoated, and,
    b) subsequent to the application of the coating, directing a jet consisting essentially of a liquid through the second end of the at least one passage of a step a), so that the liquid through the first end to remove at least a portion of any coating located within, or obstructing, the at least one passage to define a clear, through passage between the second and first surfaces including through any coating thereon.

2. A method as claimed in claim 1 in which the liquid jet is a water jet.

3. A method as claimed in claim 1 in which the at least one passage is arranged to provide, in use, a cooling flow for the component.

4. A method as claimed in claim 1 in which component is made from a metal and the coating is a ceramic.

5. A method as claimed in claim 1 in which the component is a combustor flame tube.

6. A method as claimed in claim 1 in which the component is a turbine blade.

7. A method as claimed in claim 1 in which said at least one passage has a first portion, adjacent the second surface, to channel the said jet before it encounters the said portion of said coating within, or obstructing, said passage.

8. A method as claimed in claim 1 in which the component has a plurality of passages, and the method comprises directing the jet through a first passage and then traversing the jet across the second surface of component to a next passage where upon it flows through the next passage.

9. A method as claimed in claim 8 in which the jet is traversed at a constant rate over a region of the second surface of the component in which the passages are located.

10. A method as claimed in claim 8 in which substantially all of the coating within the passage is removed from the first passage before the jet is traversed to the next passage.

11. A method as claimed in claim 1 in which the component is rotated relative to the fluid jet such that the fluid jet is intermittently directed through the at least one passage during the rotation of the component.

12. A method of manufacturing a component which has a wall having oppositely facing first and second surfaces and a plurality of passages within said wall with said passages each having opposite ends terminating at the first and second surfaces and has a coating applied to the first surface of the wall at least in the region of said passages the method comprising:

a) producing the component with said passages, b) applying a coating to a region of the first surface of the component containing ends of said passages, c) directing a jet consisting essentially of a liquid at the second surface through the other end of at least one of said passages of step b) so the liquid penetrates the passages from the second surface to the first surface to remove at least a portion of any coating located within or obstructing the passage to define a clear through passage between the second surface and first surface including through any coating thereon, d) repeating step c) for all of the passages in the component until the passages have substantially been cleared of any coating within, or obstructing, the passages.

13. A method of repairing a gas turbine component from which a previous coating has been removed from a first surface and which has a wall having oppositely facing first and second surfaces and a plurality of passages within said wall with said passages each having opposite ends terminating at the first and second surfaces and a new coating to be applied to the first surface from which the previous coating has been removed, the method comprising:

a) applying the new coating to a region of the first surface of the component from which the coating has been removed and containing ends of said passages terminating at said first surface, b) directing a jet consisting essentially of a liquid at the second surface through the other end of at least one of said passages of step b) so the liquid penetrates the passages from the second surface to the first surface to remove at least a portion of the new coating located within or obstructing the passage to define a clear through passage between the second surface and first surface including through the new coating thereon;

c) repeating step b) for all of the passages in the component until the passages have been substantially cleared of any coating located within or obstructing the passages.

* * * * *